Figure 1:
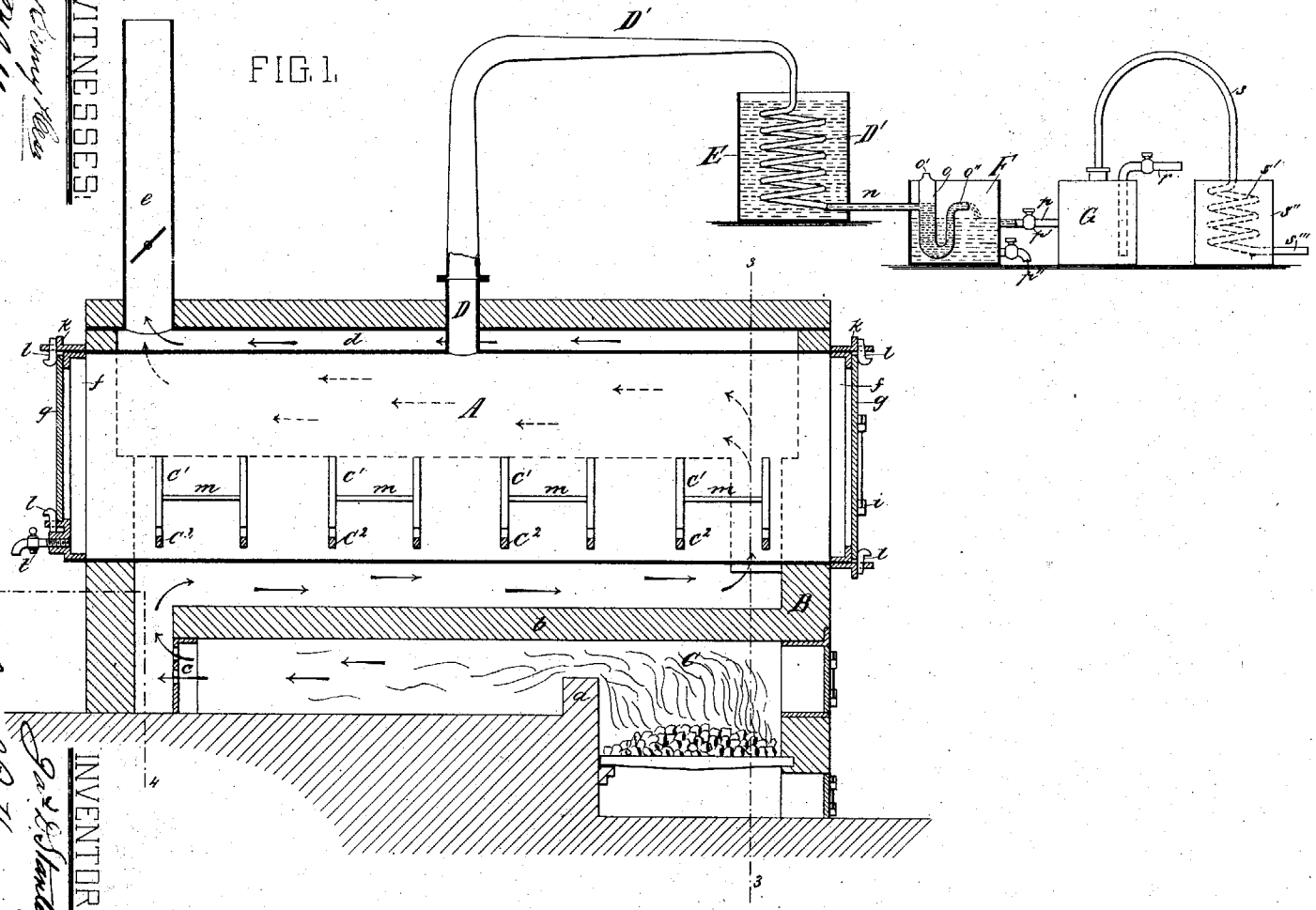

2 Sheets—Sheet 1.

J. D. STANLEY.

APPARATUS FOR DISTILLING TURPENTINE AND FOR THE PURIFICATION OF THE CRUDE PRODUCTS OF DISTILLATION THEREOF.

No. 10,689. Reissued Feb. 16, 1886.

WITNESSES:

Kimy Hess

W. Gillongan

INVENTOR:

Jas. D. Stanley

By A. P. Thayer, Atty.

2 Sheets—Sheet 2.
J. D. STANLEY.
APPARATUS FOR DISTILLING TURPENTINE AND FOR THE PURIFICATION OF THE CRUDE PRODUCTS OF DISTILLATION THEREOF.
No. 10,689. Reissued Feb. 16, 1886.
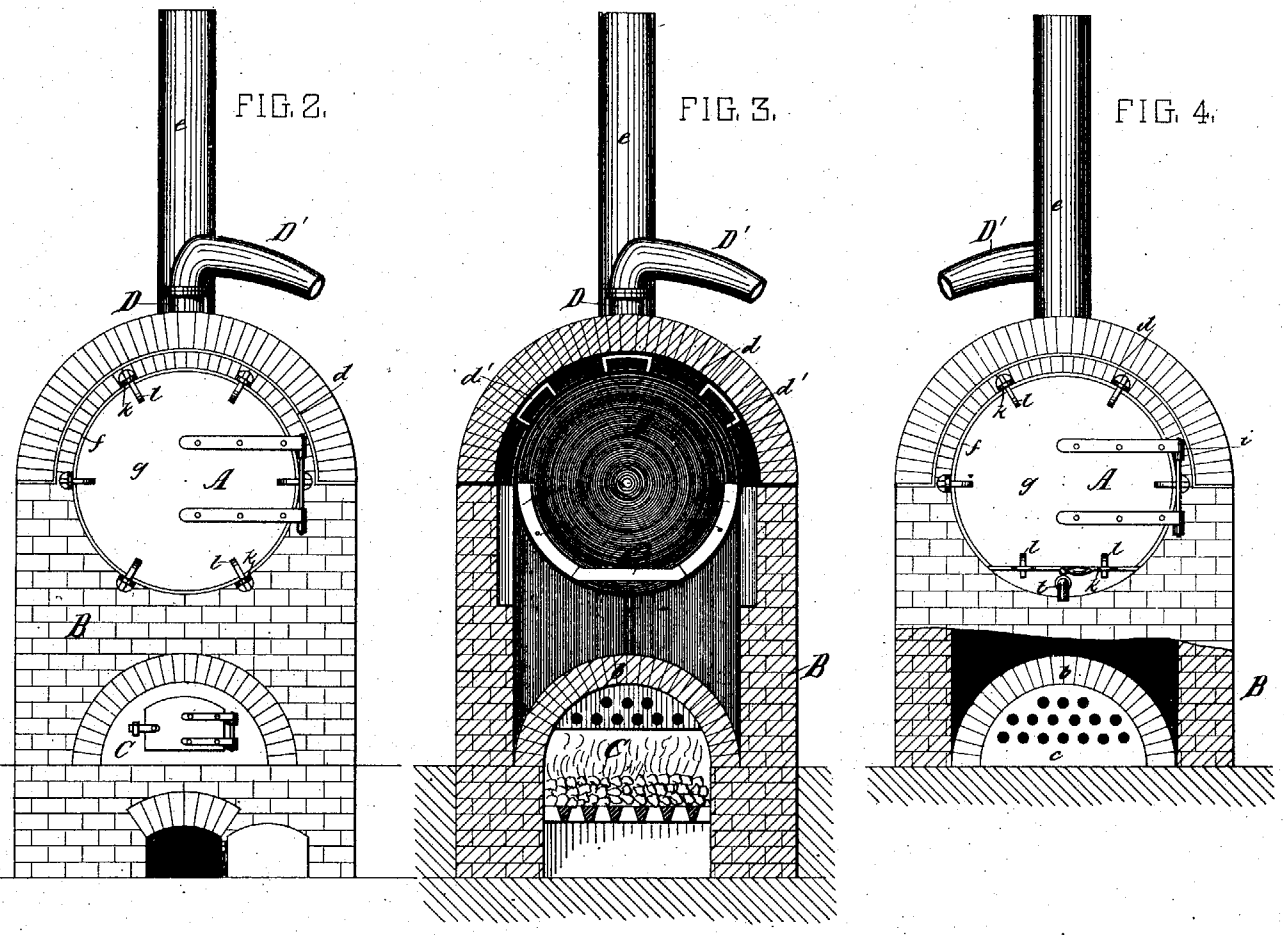
WITNESSES:
Henry Ries
W. J. Morgan
INVENTOR:
Jas. D. Stanley
By A. G. Thayer Atty.

UNITED STATES PATENT OFFICE.

JAMES D. STANLEY, OF WILMINGTON, NORTH CAROLINA.

APPARATUS FOR DISTILLING TURPENTINE AND FOR THE PURIFICATION OF THE CRUDE PRODUCTS OF DISTILLATION THEREOF.

SPECIFICATION forming part of Reissued Letters Patent No. 10,689, dated February 16, 1886.

Original No. 266,909, dated October 31, 1882. Application for reissue filed August 10, 1885. Serial No. 174,035.

*To all whom it may concern:*

Be it known that I, JAMES D. STANLEY, a citizen of the United States, residing at Wilmington, in the county of New Hanover and State of North Carolina, have invented certain new and useful Improvements in Apparatus for Distilling Turpentine and for the Purification of the Crude Products of Distillation Thereof; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to an apparatus in which the vapor caused to issue from pine-wood, or other wood of the fir species, by subjecting it to heat in a retort, is passed through a worm immersed in a cylinder holding cold water for liquefying said vapor. The liquid products then enter a trap, from which it overflows into an open vessel, and from thence it passes into a still, after which the flow from said open vessel is shut off. In the still the liquid is subjected to the action of wet steam, (in contradistinction to superheated steam,) and from thence is forced through another pipe and condensing-worm in the form of refined spirits or pure turpentine. The crude spirits from which the turpentine is produced are extracted before the wood begins to char in the retort in which it is heated.

The invention also involves the production of crude spirits and oils unfit for purification by continuing the operation after the commencement of the charring of the wood. When this takes place, the crude spirits and oils are withdrawn from the open vessel in which the trap is immersed, the communication between the said open vessel and the rest of the apparatus being closed. In conducting this process there is necessarily formed within the retort a residuum consisting of inspissated juices and exudations from the wood, together with a pitchey base, which can be used for paints, varnishes, and other purposes in the arts.

My invention consists, further, in an apparatus for carrying out the above process.

In the accompanying drawings, Figure 1 is a longitudinal elevation of the apparatus, chiefly in section. Fig. 2 is a front elevation of the same. Fig. 3 is a transverse section through the furnace on the line 3 3. Fig. 4 is a rear view, partly in section, on the line 4 4.

Similar letters of reference indicate similar parts in all the views.

A is a sheet-iron cylinder or retort, open at both ends, each end being provided with a suitable door, hereinafter more particularly described. The cylinder A is inclosed in masonry B, which is provided with an ordinary furnace, C, and bridge-wall *a*. An arch, *b*, runs longitudinally under the cylinder, terminating at a perforated end casting or plate, *c*, through which the products of combustion escape from the furnace. The flame and products of combustion are therefore not brought, when issuing directly from the combustion-chamber, into immediate contact with the cylinder, but are returned over the arch through flues provided for the purpose, taking the direction of the arrows, entering a flue, *d*, encircling the upper half of the cylinder, and ultimately reaching the stack *e*. The flue *d* is formed by an iron casing, which is inclosed by the upper brick-work, and separated from the cylinder by suitable braces, *d'*.

The purpose of constructing the cylinder with open ends is to permit the rapid cooling of the cylinder after the completion of the operation hereinafter described, and also to permit of the ready charging of the cylinder with the wood to be treated, and the discharging and cleaning of the cylinder.

The construction and arrangement of the doors are as follows: Within each end of the cylinder is secured by rivets or otherwise a cast angle-iron, *f*, which forms an abutment, against which the door *g* closes. The door is hinged at *i*. At each end of the cylinder, on the outside thereof, are placed a series of lugs, *k*, which are riveted to the cylinder and to the angle-irons *f*. These lugs project beyond the ends of the cylinder, and are provided with slots to receive keys *l*, which, when driven up, tend to close the door tightly against the angle-irons *f* and an interposed luting or clay gasket.

$C^2$ are transverse bars (here shown as eight in number) which have curved ends, as indicated particularly in Fig. 3, and which rest against the sides of the cylinder.

C′ C′ are cradles or ribs united in pairs by rods *m*, which cradles or ribs form continuations of the transverse bars, and with the latter serve to keep the wood entirely from contact with the sides of the cylinder. The cradles and transverse bars are removable.

D is a nozzle on the cylinder A, to which a worm-pipe, D′, is attached, the end of said worm-pipe passing through an open water-tank, E, and having at its end a pipe communication, *n*, which unites with the trap *o*. The trap *o* is open at its top *o′*, and provided with a goose-neck, *o″*, which latter is in the same plane as the pipe *n*. The trap *o* is surrounded by an open tank, F, which receives the crude spirits evaporated from the wood, and which pass through the neck *o″* of the trap. The construction of the trap is such that the gases ascend through the opening *o′* and escape to the open air; or they can be led to any desired point, thus avoiding any injury to the health of the attendants. The liquid products of distillation pass through the goose-neck *o″* into the tank F, and there separate on standing by gravitation into an oily and a subjacent acid portion. The oily product is led into the kettle and there distilled. By this arrangement the addition of water to the contents of the tank F and the introduction of gas into the kettle G are avoided. If the products of distillation are discharged into a closed tank and partly filled with water, the gas can be separated and the oil will separate from the water by gravitation; but by this operation all the acid products are lost, being destroyed by the water. If the discharge be through the worm without the trap into the kettle G, the products will then be mixed with inflammable and poisonous gas, which render them unfit for use, the quantity of gas being so great and so injurious to the health of the attendants that they could not endure its effects. It would also render the products highly inflammable and dangerous. The liquid resulting from the condensed vapors having risen within the open tank F to the overflow-pipe *p*, passes into the still G, and then the cock *p′* is closed in order to shut off the communication between said tank and still. The liquid admitted into the latter is subjected to a jet of wet steam issuing from the pipe *r*, which communicates with a suitable generator. The cock *p″* of the open tank F is now opened to discharge the liquid which remained in the tank and did not escape through the pipe *p*, and the products which are derived from a continuance of the treatment of the wood after the same has begun to char, consisting of heavy oils, acids, &c., being also withdrawn through the cock *p″*. The action of the steam is continued in the closed still G until the spirits are driven therefrom through the pipe *s* and condensing-worm *s′*, submerged in the vessel *s″*, whence they are passed through the pipe *s‴*, which remains continually open, to a suitable receiver in the form of refined spirits or pure turpentine. Any residuum which is left within the retort resulting from the continued heating of the wood is drawn (such of it as is liquid) through the cock *t*. The solid matters which remain—such as charcoal and the pitchy base before referred to—are removed when the doors *g* are opened, which removal is facilitated by the fact that the entire interior parts of the cylinder, consisting of the grates and cradles, are capable of being taken out.

My process is first directed solely to the production of refined spirits or turpentine, and consequently the cock *p′* is left open, so that the condensed vapors may overflow to the still G until the wood commences to char, when the said cock is closed and the process of purifying the crude spirits in the still G by the use of steam and by condensation is begun. Then the process assumes a twofold character—viz., the production of refined spirits and the continued production of crude spirits and oils unfit for further purification and distillation in the open tank F, from which they are drawn through the cock *p″*. The use of wet steam as an agency in the distillation and purification of the crude spirits is of importance, the steam not only serving as a motive force to expel the spirits from the closed tank, but also acting to separate the impurities and liberate the coloring-matter. The steam, when used in this manner and in connection with the condensing appliances, has been found to purify and clarify the crude spirits in a rapid, effective, and economical manner, and to produce a superior article.

Among the special advantages pertaining to my apparatus, as herein described, may be mentioned the construction of the cylinder, which, being open at both ends, can be readily charged, discharged, cooled, and cleaned. The cradles and transverse bottom bars keep the wood from contact with the sides of the cylinder, and thereby prevent the too rapid charring of the wood, as also the adhesion of the wood to the interior of the cylinder. I have found that in order to produce the best results the wood must not be subjected to a sudden, rapid, or intense heat, and that therefore the cylinder must not be subjected to the direct action of the flame, which not only chars the wood too rapidly, and burns the matter liberated therefrom, but also destroys the residuums which have merchantable value. In order to prevent this injurious action, I construct the furnace with the arch *b*.

Having thus described my invention, I claim—

1. The combination of the fire-box C, the arch *b*, the retort-chamber above the same, and the retort located therein, with spaces above and below separated for the greater part of the length of the chamber, but connected at one end, as described, and for the purpose specified.

2. In an apparatus for distilling turpentine from wood, the combination of the tank F, trap *o o′ o″*, inlet-pipe *n*, outlet-pipe *p*, having cock *p′*, steaming-chamber G, outlet-pipe *s*, and condensing worm and tank *s′ s″*, with the retort A, outlet-pipe D, tank E, and worm D′, as and for the purpose set forth.

In testimony whereof I affix my signature in presence of two witnesses.

JAMES D. STANLEY.

Witnesses:
JAMES TUPPER,
GEO. S. BROWN.